UNITED STATES PATENT OFFICE.

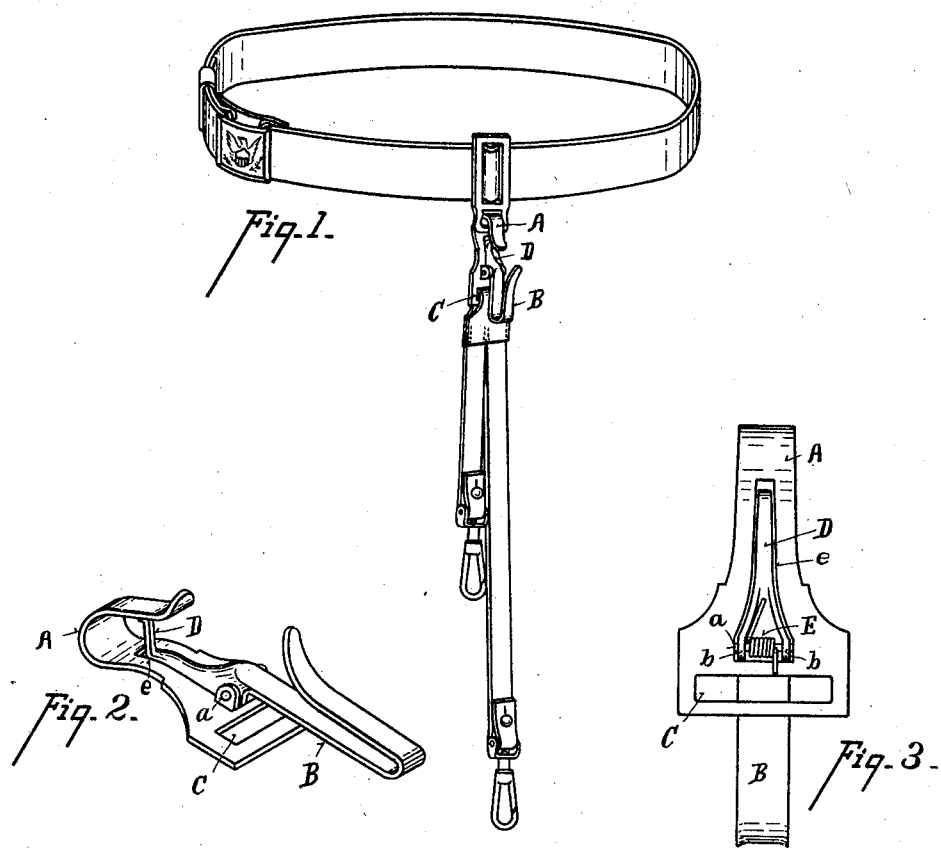

JAMES PETTIBONE, OF CINCINNATI, OHIO.

SWORD-SLINGING HOOK.

SPECIFICATION forming part of Letters Patent No. 603,538, dated May 3, 1898.

Application filed October 11, 1897. Serial No. 654,804. (No model.)

*To all whom it may concern:*

Be it known that I, JAMES PETTIBONE, residing at Cincinnati, in the county of Hamilton and State of Ohio, have invented certain new and useful Improvements in Sword-Slinging Hooks, of which the following is a specification.

The object of my invention is to provide a sword-fastening device which can be readily attached to and detached from the belt, having a safety-guard for securely holding it in position.

The features of my invention are more fully set forth in the description of the accompanying drawings, making a part of this specification, in which—

Figure 1 is a perspective view of my device, showing the scabbard-supporting straps attached, the device being suspended in position from the belt. Fig. 2 is a perspective view of my fastening device. Fig. 3 is a rear elevation of the same.

My fastening device consists of an upper and a lower hook member A and B, the lower member B being for the purpose of receiving the upper ring of the sword-scabbard, the upper hook member being for the purpose of engaging with a loop on the sword-belt.

C represents a slot in the upper member for receiving the scabbard-suspending strap.

D represents the safety-guard, which rests in a recess $e$, formed in the shank of the upper hook member, the lower hook member being preferably made integral with this safety-guard.

$a$ represents the pivot; $b$, ears in which said pivot journals; and D represents the guard, which is bent outward to rest against the upper hook member A.

E represents a spring for holding the guard in contact with the hook. In the preferred form of construction this spring is coiled around the pivot $a$, one end of the spring engaging the guard member D and the other end engaging the shank of the upper hook A.

It will readily be seen that the hook A is snapped on the belt, guard D yielding to allow the hook to pass over the ring and closing to guard the same. In order to unhook the same, the lower hook B is rocked on its pivot, depressing the guard D in the recess $e$ sufficiently to allow the disengagement of the hook. This guard effectually prevents the hook from becoming accidentally disengaged from the belt and is especially useful in the cavalry service, as it is adapted to be disengaged from the belt and suspended from a ring on the saddle, as well as from the sword-belt. Also the sword can be readily attached and detached without removing the belt.

Having described my invention, I claim—

1. A sword-fastening device, consisting of an upper hook member A, provided with a central recess $e$, a lower hook member B, pivoted to the said upper member and having a guard extension D, which normally lies upon the under side of the hook portion of the upper member, said extension of the lower hook playing in the recess in the upper hook member, substantially as described.

2. A sword-fastening device, consisting of an upper hook member A, provided with a central recess $e$, and a strap-opening $c$, below said recess, a lower hook member B, pivoted to the said upper member and having an extension which lies in the recess $e$, in the upper member, and a guard D, at the end of said extension, which normally presses upon the under side of the hooked portion of the upper member.

3. A sword-fastening device consisting of the upper and lower hook members A, B, pivoted together by means of a pin supported upon the upper hook member, said lower hook member having an extension beyond the pivot-point lying within a recess in the upper hook member, and a spring connecting said upper and lower hook members and adapted to press the guard against the upper hook member, substantially as specified.

4. A sword-fastening device consisting of the upper hook member A provided with a recess $e$, a lower hook member B centrally pivoted to said upper member, the upper extension D of the lower hook member lying within said recess and provided with a pressure device adapted to strain the guard member D against the upper hook member, substantially as specified.

In testimony whereof I have hereunto set my hand.

JAMES PETTIBONE.

Witnesses:
W. R. WOOD,
R. M. BICKERSHOFF.